United States Patent [19]

Sakamoto

[11] Patent Number: 4,794,366
[45] Date of Patent: Dec. 27, 1988

[54] KEY-TOUCH SENSOR AND METHOD OF MANUFACTURE

[75] Inventor: Ryuji Sakamoto, Ohta, Japan

[73] Assignee: Toshiba Silicone Co., Ltd., Japan

[21] Appl. No.: 929,557

[22] Filed: Nov. 10, 1986

[30] Foreign Application Priority Data

Nov. 15, 1985 [JP] Japan .............................. 60-254899
Nov. 15, 1985 [JP] Japan .............................. 60-254900

[51] Int. Cl.$^4$ ...................... H01C 10/10; H01C 10/12
[52] U.S. Cl. ...................................... 338/114; 338/99; 29/620
[58] Field of Search ............... 338/92, 99, 114, 47; 200/245, 250, 264, 265; 29/610 R, 592 R, 620

[56] References Cited

U.S. PATENT DOCUMENTS

| | | | |
|---|---|---|---|
| 4,273,682 | 6/1981 | Kanamori | 252/511 |
| 4,314,227 | 2/1982 | Eventoff | 338/114 X |
| 4,347,505 | 8/1982 | Anderson | 338/100 X |
| 4,426,884 | 1/1984 | Polchaninoff | 338/114 X |
| 4,503,416 | 3/1985 | Kim | 338/99 |
| 4,503,705 | 3/1985 | Polchaninoff | 338/47 X |

Primary Examiner—E. A. Goldberg
Assistant Examiner—M. M. Lateef

[57] ABSTRACT

A key-touch sensor has an electric circuit formed on a first electrically insulating substrate covered with a carbon electrode, an electric circuit formed on a second electrically insulating substrate covered with a carbon electrode which is opposed to the electric circuit on the first substrate across a gap, and a pressure-sensitive electroconductive layer deposited to at least one of the first or second substrates and disposed to fill the gap.

13 Claims, 2 Drawing Sheets

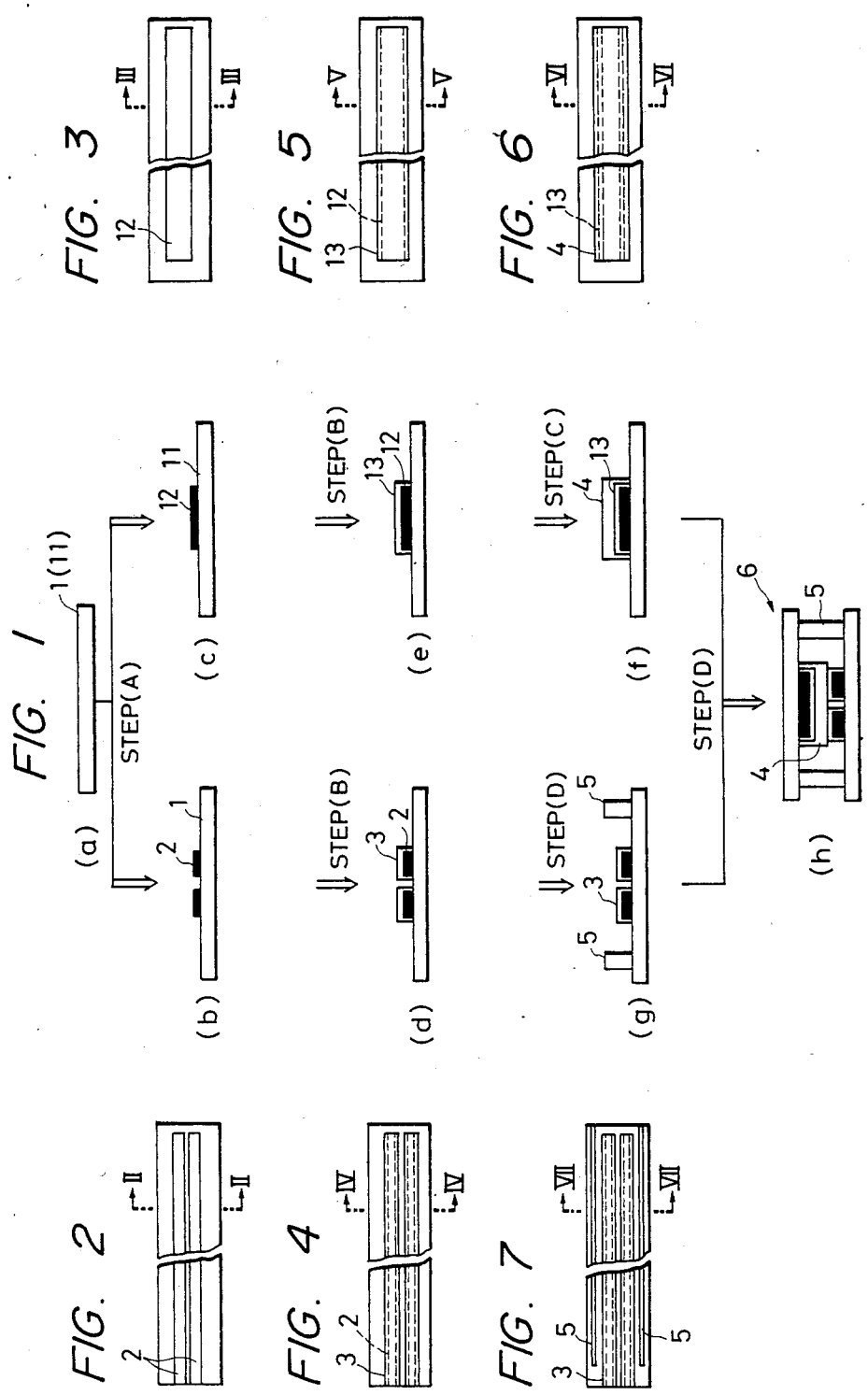

KEY-TOUCH SENSOR AND METHOD OF MANUFACTURE

The present application claims the priority of Japanese Patent Applications Ser. No. 60-254899 and No. 60-254900 both filed on Nov. 15, 1985.

BACKGROUND OF THE INVENTION

This invention concerns a key-touch sensor and method of manufacture therefor. More specifically, this invention relates to a key-touch sensor having output voltage characteristics as a function of the load upon touching the keyboard and the method of manufacturing the same. The key-touch sensor of the invention has a novel structure, shows less variations in the load-output voltage characteristics and exhibits good reproducibility. It is suited to mass production with reduced thickness and in an integrated form.

Various kinds of switches using pressure-sensitive electroconductive rubber sheets for input elements have generally been used as electronic parts. Examples of input switches utilizing pressure-sensitive electroconductive rubber sheet, include ordinary ON-OFF switches, as well as input elements in a device for detecting manuscription input positions. Further, a key-touch sensor for use in electronic musical organs using pressure-sensitive electroconductive rubber sheets (as disclosed in Japanese Patent Publication Kokai Nos. 53-79937 and 54-80350) has been put to practical use by applying the property of the pressure-sensitive electroconductive rubber as the pressure-sensitive sensor. The sensor or keyboard has a structure in which a ribbon of a pressure-sensitive electroconductive rubber sheet sandwiched between metal sheets as electrodes is placed in a shallow groove disposed in an extruded material made of polyvinyl chloride resin and covered from above with felt. After depressing a key for producing a sound, when further pressure is applied resistance change is caused to the sensor, which is converted into an electric signal between terminals by a constant current and outputted as a predetermined control signal from an operational amplifier. Volume, tone or pitch of the sound may be controlled in this manner.

However, key-touch sensors using the pressure-sensitive electroconductive rubber sheet have a drawback in that the load-output voltage characteristics vary and the reproducibility thereof is not satisfactory. Accordingly, a sensor of this type cannot be used as a key-touch sensor requiring high accuracy. Further, in the case of manufacturing the key-touch sensor, the number of production steps is great due to the complicated shape. No satisfactory mass production can be obtained by the existent molding process since an extremely long ribbon-like sheet is required. The sensor manufactured by the method of the prior art also has the drawbacks that the thickness is large, setting to the electrode is difficult and the sensor is expensive.

F. N. Eventoff discloses, in U.S. Pat. Nos. 4,268,815, 4,314,277 and 4,315,238, a pressure-sensitive switch or pressure transducer, in which the first and second contacts are usually placed opposing each other and the opposing faces are brought into contact to establish electrical conduction by an external pressure through a pressure-sensitive layer and/or semiconductor layer. One of the features of these patented inventions resides in the fact that at least one of the layers put between the contacts is constituted with a layer containing semiconductive particles such as molybdenum sulfide particles. However, the structure having such a semiconductor layer has draw-backs in that the pressure-response varies and response changes with aging. Also, the anisotropy leads to restriction in the application use.

DESCRIPTION OF THE INVENTION

This invention provides a key-touch sensor comprising: an electric circuit formed on a first electrically insulating substrate and covered with a carbon electrode; an electric circuit formed on a second electrically insulating substrate, covered with a carbon electrode which is opposed to the electric circuit on the first substrate across a gap; and a pressure-sensitive electroconductive layer deposited at least on one of the first or second substrates and disposed to fill the gap between them, as well as a method of manufacturing the same.

The electrically insulating substrate for use in this invention may have either a plate-like or film-like form and be of a rigid or a flexible nature. For instance, films, laminates and molding products made of phenol resin, epoxy resin, polyester resin, silicone resin, polyimide resin and natural or synthetic rubber may be used. Desirably, the thickness of the substrate ranges from 0.015 mm to 2 mm and, more desirably, from 0.1 to 0.5 mm. If the thickness is less than 0.015 mm, screen printing is difficult and the strength is poor. On the other hand, if it exceeds 2 mm, the molding is more difficult and the cost is increased.

The electric circuit may be formed on the substrate by a method of appending an electroconductive metal foil to a substrate followed by etching, a method of vapor-depositing electroconductive metal, a method of screen printing an electroconductive paste such as with silver, etc. The screen printing process is suitable for forming a long ribbon-like pattern with high accuracy and economically. Screen printing of the carbon paste is also suitable for covering the electric circuit with carbon electrode.

As the pressure-sensitive electroconductive layer deposited on the circuit, a silicone rubber, in which particles of one or more metals selected from silver, copper and nickel, and carbon black are dispersed, is suitable. Particularly, nickel powder surface-treated with a platinum compound as disclosed in Japanese Patent Publication Kokai No. 59-98164 is preferred as this metal powder can provide fewer variations in the load-output voltage characteristics and excellent reproducibility. Such rubber can be provided with adhesiveness to the substrate and can also be coated directly to the electrode by means of screen printing or the like. An extremely long ribbon-like shape which has been difficult to form in the prior art can be obtained easily and integration is also possible.

The thickness of the pressure-sensitive electroconductive layer is suitably from 10 to 80 micro meters and, preferably, from 25 to 50 micro meters in view of the pressure-sensitive electroconductivity. If the thickness is less than 10 micro meters, it is difficult to attain the initial insulation. On the other hand, if it exceeds 80 micro meters, the output voltage is too low and shows greater variance.

It is preferred to bond the first and second electrically insulating substrates with each other while putting the electric circuits and the pressure-sensitive electroconductive layer therebetween. This facilitates setting the key touch sensor to a mounting plate in, for example, an electronic musical organ. Any method may be employed to bond the substrates such as methods where adhesives are formed through screen printing, where double-face adhesive tape is used and where various other kinds of adhesives are utilized. The bonding method where adhesives are formed through screen printing is most cost effective.

Felt may be used to cover the key-touch sensor and a double-face adhesive tape may be appended to the lower surface so as to facilitate the setting to a mounting plate.

By combining such constituent factors in this invention as described above, a key-touch sensor for use in an electronic musical organ can be provided.

The manufacturing method according to this invention comprises: (A) forming conductor circuits on the first and second electrically insulating substrate; (B) covering the conductor circuits with a carbon paste; (C) forming a pressure-sensitive electroconductive layer by coating and curing a pressure-sensitive electroconductive paste to either one of the first or second electrically insulating substrates having conductor circuits covered with the carbon coating in step (B); and (D) opposing and bonding the electrically insulating substrate formed with the pressure-sensitive electroconductive layer in step (C) to the electrically insulating substrate not formed with the pressure-sensitive electroconductive layer, while putting the conductor circuits and the pressure-sensitive electroconductive layer therebetween.

EXAMPLES OF THE INVENTION

The examples below are given for the purpose of illustration and are not intended in any way or means to limit the present disclosure. All parts in the examples are by weight.

REFERENCE EXAMPLE 1

(Preparation of electroconductive metal powder treated with platinum compound)

100 parts of 1 weight % solution of vinylsiloxane-coordinated platinum complex in xylene were added to 100 parts of nickel particles with average particle size of 3-7 micro meters obtained from nickel carbonyl, which were then stirred, heated and refluxed. After 4 hours, the complex-treated particles were filtered, washed and then heated at 150° C. for 2 hours to obtain nickel particles treated with platinum-siloxane complex.

REFERENCE EXAMPLE 2

(Preparation of pressure-sensitive electroconductive silicone rubber paste)

300 parts of nickel particles treated with platinum-siloxane complex in Example 1 and 6 parts of acetylene black were added to 100 parts of an addition cured type silicone rubber composition: TSE 3221 (trade name, produced by Toshiba Silicone Co.) and mixed preliminarily in a small blender. This preliminary mixture was then treated on a three roll mill to obtain a pressure-sensitive electroconductive silicone rubber composition. Further, 1.5 parts of solvent: Hiaron 2S (trade name, produced by Nisseki Co.) were added for dilution to 100 parts of the above mentioned composition for controlling the viscosity to obtain a pressure-sensitive electroconductive silicone rubber paste.

EXAMPLE 1

FIG. 1 is a step flow chart for this example shown in a schematic cross sectional view. Two sheets of electrode substrate films were manufactured as below.

Polyurethane resin blended with silver particles was applied by way of screen printing to a polyester film 1 sized 20 X 1000 mm and 188 micro meter thickness shown in FIG. 1 (a), cured and then dried to form two parallel electrodes 2 of 10 micro meter thickness (shown in FIG. 1(b). Further, an electrode 12 that could be brought into contact with the two parallel electrodes was formed on a polyester film 11 (shown in FIG. 1(c), Step (A).)

The plan view for the electrode substrate films shown in FIGS. 1(b) and (c) is shown in FIGS. 2 and 3 respectively. The cross sections shown in FIGS. 1(b) and (c) are, respectavely, along with lines II—II in FIG. 2 and line III—III in FIG. 3 (relationships between the FIGS. 1(d)-(g) and FIGS. 4 through 7 are the same as described above).

A polyurethane resin blended with carbon was then applied screen printing to the two parallel electrodes 2, cured and dried resulting in a carbon coating 3 with a 10 micro meter thickness (refer to FIG. 1(d)). In the same way, carbon coating 13 was also applied to electrode 12 that could be brought into contact with the two electrodes. (Refer to FIG. 1(e), Step (B)).

The plan views for the carbon-coated electrode substrate films in FIGS. 1(d) and (e) are, respectively, shown in FIGS. 4 and 5.

The pressure-sensitive electroconductive paste obtained in Reference Example 2 was applied by screen printing over the carbon-coated electrode 13 shown in FIG. 1(e) using a polyester screen plate of 150 mesh and 120 micro meter of total thickness, and dried under heating at 120° C. for 30 minutes. The thus formed pressure-sensitive electroconductive layer 4 had a thickness of 40 micro meter. (Refer to FIG. 1(f), Step (c)).

The plan view of the substrate film printed with the pressure-sensitive electroconductive layer in FIG. 1(f) is shown in FIG. 6.

Two acrylic resin type adhesive layers were then screen-printed to the outside of the carbon-coated electrode 3 in FIG. 1(d) parallel with the electrodes and dried to form adhesive layers 5 (FIG. 1(g), step (D)).

The plan view of the adhesive layer printed substrate film in FIG. 1(g) is shown in FIG. 7.

Then, as shown in FIG. 1(h), the electric circuit film formed with the pressure-sensitive electroconductive layer (FIG. 1(f)) and the electric circuit film disposed with the adhesive layer (FIG. 1(g)) were bonded together, through the adhesive layer 5, to constitute the key-touch sensor 6 of Example 1, step D).

COMPARATIVE EXAMPLE 1

A key-touch sensor was manufactured by the same steps as in Example 1, except a pressure-sensitive electroconductive rubber sheet of 0.5 mm thickness (manufactured by Yokohama Rubber Co. Ltd.) was used instead of forming the pressure-sensitive electroconductive layer in Example 1.

Key-touch sensor 6 was set by covering with felt 8 using a double-face adhesive tape 7, then appended to the mounting plate below the key 9 of an electronic musical organ also by means of a double-face adhesive tape 7.

A voltage at DC 5 V was applied between two parallel electrodes shown in FIG. 1(h). The relationship between the load applied to the key and the output voltage along with the variations thereof were measured. FIG. 9 shows the result of ten measurements for each load applied to an identical positon on the key. FIG. 10 shows the result of ten measurements for each load changing the position of the load on the keyboard 50 mm with each measurement. In the graphs, the solid line was prepared by connecting average values and the broken line ws prepared by connecting maximum and minimum values respectively. As can be seen from FIGS. 9 and 10, the key-touch sensor according to this invention showed excellent characteristics with no scattering and excellent reproducibility.

An identical evaluation was also carried out for the key-touch sensor in Comparative Example 1. FIG. 11 shows the results where the load was applied at one identical position on the keyboard. FIG. 12 shows the result where the position of the load applied on the keyboard was varied on every 50 mm. As can be seen from FIGS. 11 and 12, the output voltage values from the key-touch sensor in the comparative Example 1 had wide variance on every measurement and reproducibility was poor.

According to this invention, load-output voltage characteristics exhibit less scatter, and reproducibility is excellent. Further, since the pressure-sensitive electroconductive layer or the like is constituted with paste material such as a pressure-sensitive electroconductive paste, it is possible to provide a key-touch sensor of a novel structure. Such a sensor is suitable for mass production with reduced thickness and as a single integrated piece.

BRIEF EXPLANATION OF THE DRAWINGS

FIG. 1 is a flow chart for explaining the steps of Example 1 in a schematic cross sectional view.

FIG. 2 is a plan view of an electrode-printed substrate film formed with two parallel electrodes in step (A).

FIG. 3 is a plan view of an electrode-printed substrate film formed with an electrode that can be in contact with the two parallel electrodes in step (A).

FIGS. 4 and 5 are, respectively, plan views of carbon-coated electrode substrate films in which carbon is coated on the electrodes in step (B).

FIG. 6 is a plan view for the carbon-coated electrode substrate film formed with a pressure-sensitive electroconductive film in step (C).

FIG. 7 is a plan view of a carbon-coated electrode substrate film formed with an adhesive layer in step (D).

FIGS. 1(b) through (g) are cross sectional views corresponding to FIGS. 2 through 7 respectively.

Figure 11:
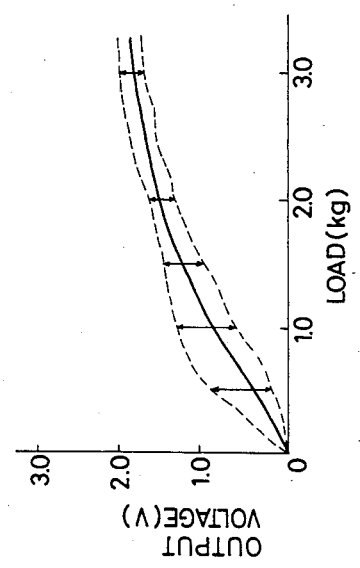
FIGS. 9 through 12 are graphs for explaining the effect of the invention.
Figure 12:
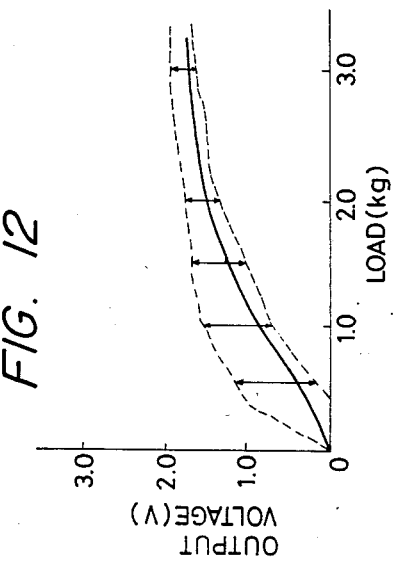
Figure 8:
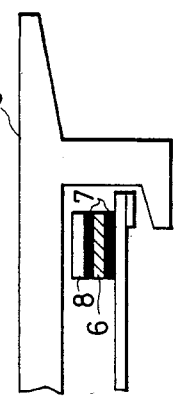
FIG. 8 is a schematic cross sectional view showing the position in which the key-touch sensor is set to an electronic musical organ for the evaluation.
Figure 9:
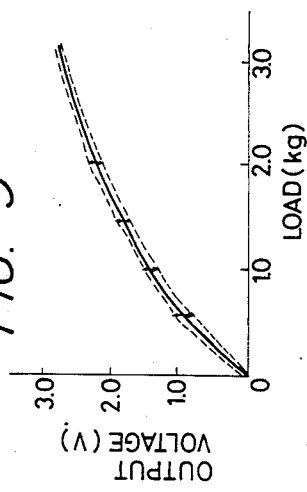
Figure 10:
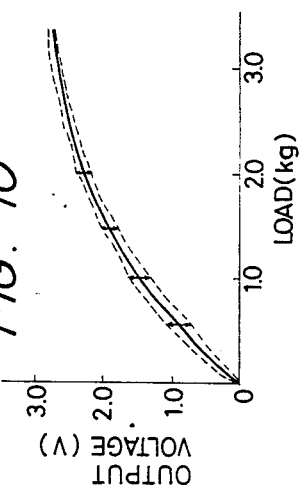

The numbers designate parts as follows:
1,11 . . . electrically insulating substrate (polyester film),
2,12 . . . conductor circuit (silver electrode),
3,13 . . . carbon-coated electrode,
4 . . . pressure-sensitive electroconductive layer,
5 . . . adhesive layer,
6 . . . key-touch sensor,
7 . . . double-face adhesive tape,
8 . . . felt,
9 . . . keyboard key.

What is claimed is:

1. A key-touch sensor comprising: an electric circuit formed on a first electrically insulating substrate and covered with a carbon electrode, an electric circuit formed on a second electrically insulating substrate, covered with a carbon electrode, said electric circuit of the second substrate opposed to said electric circuit of the first substrate across a gap; and a silicone rubber pressure-sensitive electroconductive layer deposited at least on one of said first or second substrates and disposed to fill said gap.

2. A key-touch sensor as defined in claim 1, wherein the first and second electrically insulating substrates are made of flexible insulating substrate film or resin plate with a thickness of from 0.015 mm to 2 mm.

3. A key-touch sensor as defined in claim 1, wherein the pressure-sensitive electroconductive layer is formed with a paste in which surface-treated electroconductive metal powder and carbon black are dispersed in a silicone rubber composition.

4. A key-touch sensor as defined in claim 1, wherein the thickness of the pressure-sensitive electroconductive layer is between 10 micro meter to 80 micro meter.

5. A key-touch sensor as defined in claim 1, wherein the first and second electrically insulating substrates are bonded to each other while putting the electric circuits and the pressure-sensitive electroconductive layer therebetween.

6. A method of manufacturing a key-touch sensor comprising: (A) forming conductor circuits on the first and second electrically insulating substrates; (B) coating said conductor circuits with a carbon paste; (C) forming a silicone rubber pressure-sensitive electroconductive layer by coating and curing a silicone rubber pressure-sensitive electroconductive paste to either one of the first or second electrically insulating substarates having conductor circuits applied with carbon coating; and (D) opposing and bonding the electrically insulating substrate formed with the pressure-sensitive electroconductive layer in step (C) to the electrically insulating substrate not formed with the pressure-sensitive electroconductive layer while putting the conductor circuits and the pressure-sensitive electroconductive layer therebetween.

7. A method of manufacturing a key-touch sensor as defined in claim 6, wherein the first and second electrically insulating substrates are made of flexible insulating substrate film or resin plate with a thickness of from 0.015 mm to 2 mm.

8. A method of manufacturing a key-touch sensor as defined in claim 6, wherein the conductor circuit on the electrically insulatig substrate is formed by way of screen printing of an electroconductive paste.

9. A method of manufacturing a key-touch sensor as defined in claim 6, wherein said carbon coating on the conductor circuits are made by way of screen printing of a carbon paste.

10. A method of manufacturing a key-touch sensor as defined in claim 6, wherein the pressure-sensitive electroconductive paste is coated by screen printing.

11. A method of manufacturing a key-touch sensor as defined in claim 6, wherein the pressure-sensitive electroconductive paste is that in which surface-treated electroconductive metal and carbon black are dispersed in a silicone rubber composition.

12. A method of manufacturing a key-touch sensor as defined in claim 6, wherein the thickness of the pressure-sensitive electroconductive layer is between 10 micro meter and 80 micro meter.

13. A method of manufacturing a key-touch sensor as defined in claim 6, wherein the first and second substrates with circuits are secured in step (D) by means of adhesives, and said adhesives are coated by means of screen printing.

* * * * *